Figure 1:
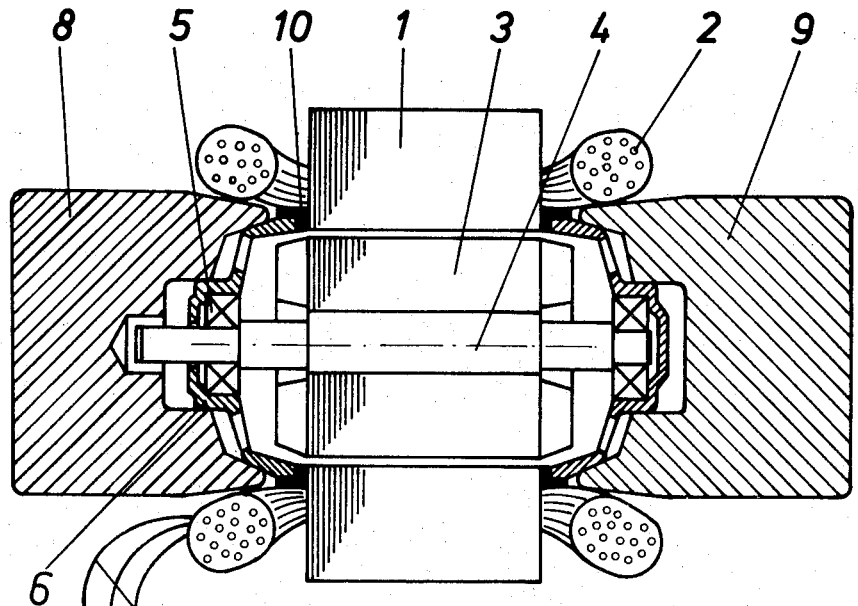

United States Patent
Hallerback

[15] 3,694,909
[45] Oct. 3, 1972

[54] METHOD FOR MANUFACTURING ELECTRIC ROTARY MACHINES

[72] Inventor: Stig Lennart Hallerback, 12 Blodboksgatan, Vastra Frolunda, Sweden

[22] Filed: Nov. 18, 1970

[21] Appl. No.: 90,714

[30] Foreign Application Priority Data

Nov. 19, 1969 Netherlands ..........6917401

[52] U.S. Cl. .......................29/596, 29/593, 310/42, 310/43, 310/90
[51] Int. Cl. ....H02k 15/00, H02k 15/14, H02k 15/16
[58] Field of Search ....29/596, 598, 593; 310/42, 43, 310/90, 89

[56] References Cited

UNITED STATES PATENTS

| | | | |
|---|---|---|---|
| 3,437,853 | 4/1969 | Arnold | 29/596 X |
| 2,749,456 | 6/1956 | Luenberger | 310/43 |
| 3,484,934 | 12/1969 | Wightman | 29/596 |
| 3,518,471 | 6/1970 | Wightman et al. | 310/90 X |
| 3,058,156 | 10/1962 | O'Connor | 310/43 UX |

*Primary Examiner*—John F. Campbell
*Assistant Examiner*—Carl E. Hall
*Attorney*—Howson & Howson

[57] ABSTRACT

The present disclosure relates to a manufacturing method for electric rotary machines. By employing this method the machines, e.g. electric motors, can be submitted to a running test before the rotor assembly is permanently mounted by bonding its cup-shaped bearing supports to the ends of the stator core inside the stator winding heads. Machines which fail to meet the requirements need not be scrapped, but can be readily disassembled for recovering their good components.

7 Claims, 2 Drawing Figures

INVENTOR:
STIG LENNART HALLERBÄCK

METHOD FOR MANUFACTURING ELECTRIC ROTARY MACHINES

The present invention relates to a method for manufacturing electric motors and other rotary electric machines which comprise a stator, a rotor and bearing supports comprising a cup-shaped member attached at its larger end to the stator core in a permanent way by bonding and supporting at its smaller end a rotor bearing.

The principal steps in conventional manufacture of electric motors are as follows: In the first place a stator core is assembled of punched stator plates which are joined together by means of rivetting, welding or otherwise. Winding bundles are inserted in the stator slots together with the necessary insulating material. The winding bundles are usually impregnated with lacquer. The completed stator is provided with an outer motor casing, or not, as the case may be, and the rotor and bearing supports complete with bearings are mounted.

During manufacture checks are made at several stages. When virtually completed the motor is finally tested in electric and mechanical respects and is submitted to a test run. A rather heavy percentage of motors will prove faulty in one way or other on the test run, a major cause of rejection being insulation faults or breaks in the winding bundles. If electric faults are found, the complete motor is often discarded, especially when being of small size. If mechanical faults, such as bearing noise, appear, the motor is disassembled and is submitted to a fresh test run.

In electric motors of certain types the bearing supports are secured to the stator in a non-dismountable manner, as by means of a bonding agent or moulding. For such motors, the rejection problem is of a difficult nature by reason of the structural interconnections being totally unsuited for disassembling and fresh use of the components, and this kind of assembly has normally not been deemed feasible by reason of prohibitive costs, unless there are special requirements which can be met only by such motors. For motors having the bearing supports attached to the stator inside the winding heads such a mounting of the bearing supports is virtually the sole practicable solution, as a positive mechanical interconnection must be discounted in other than special instances.

The fixation of the bearing supports to the stator inside the winding heads by use of a bonding agent or moulding will, however, cause difficulties if a bonding or moulding substance can penetrate into the rotor chamber through the winding slots open towards the cavity of the stator core receiving the rotor, or through apertures in the bearing supports. A sealing of the winding slot apertures may be attained, if guiding surfaces for the bearing supports are moulded on at the stator core end faces by means of mandrels which prevent bonding or moulding substance from penetrating into the rotor chamber, or by providing the rotor cavity with lining means extending to a small degree beyond the stator core end faces and continued by the bearing supports.

It is a chief object of the invention to reduce manufacturing costs of electric motors and like rotary electric machines by very substantially keeping down the rejection at a late stage of manufacturing at the same time as the necessary checking measures are adapted to an automatized assembly routine. A further object of the invention is the provision of an assembling method specially adapted for electric motors having bearing supports which are bonded to the stator core inside the winding heads as by cementing or moulding.

In practicing the manufacturing method according to the invention the stator core is manufactured in a manner known in itself, whereafter the winding bundles are brought into the stator slots. In the stator thus formed the rotor with the bearing supports and rotor bearings is mounted coaxially with the rotor cavity in the stator, a mounting device being employed for maintaining the motor components in the said relative position, and the motor is inspected and test run according to known routines for determining its electric and mechanical properties, the bearing supports are bonded to the stator core by cementing or moulding with the mounting device sealing against the bearing support, and the motor is removed from the mounting device. In certain motor constructions the bonding of the bearing supports by cementing or moulding is suitably carried out at the same time as the stator windings are insulated with lacquer or the like in a manner known in itself.

A major advantage of the method according to the invention consists therein that the electric and mechanical tests may be concentrated to an early stage of manufacture, instead of being carried through when the motor has been finally assembled. By this reason much rejection may be avoided, as faulty motor components and a non-satisfactory operation are discovered at this early stage. It thus will be possible to recover good components for use without specific dismounting steps and, in case of faulty motors, the manufacturing steps still remaining can be suspended. When disassembling is attempted after final assembly, followed by a conventional test run, damage of certain components, faultless as such, for example bearing supports attached through bonding, is hardly to be avoided. When the bonding of the bearing supports to the stator core is carried out at the same time as the winding bundles are insulated by means of lacquer or the like, it is a further advantage that the core of a faulty stator can be reclaimed without the need for specific measures for removing winding bundles already impregnated with lacquer, and that the copper of the winding bundles can be recovered without being contaminated with the insulating substance, as the test run may be carried through before the insulation of the winding bundles.

After the motor has passed successfully the test run in the mounting device, its connections with the electric power source may be left closed, and it can be fed with electric current preferably during or after the cementing or moulding-in operation. The heat developed will act upon the bonding substance so as to accelerate its setting. A rapid rise in temperature may be attained in any suitable known manner, such as mechanically braking or arresting the rotor.

Figure 2:
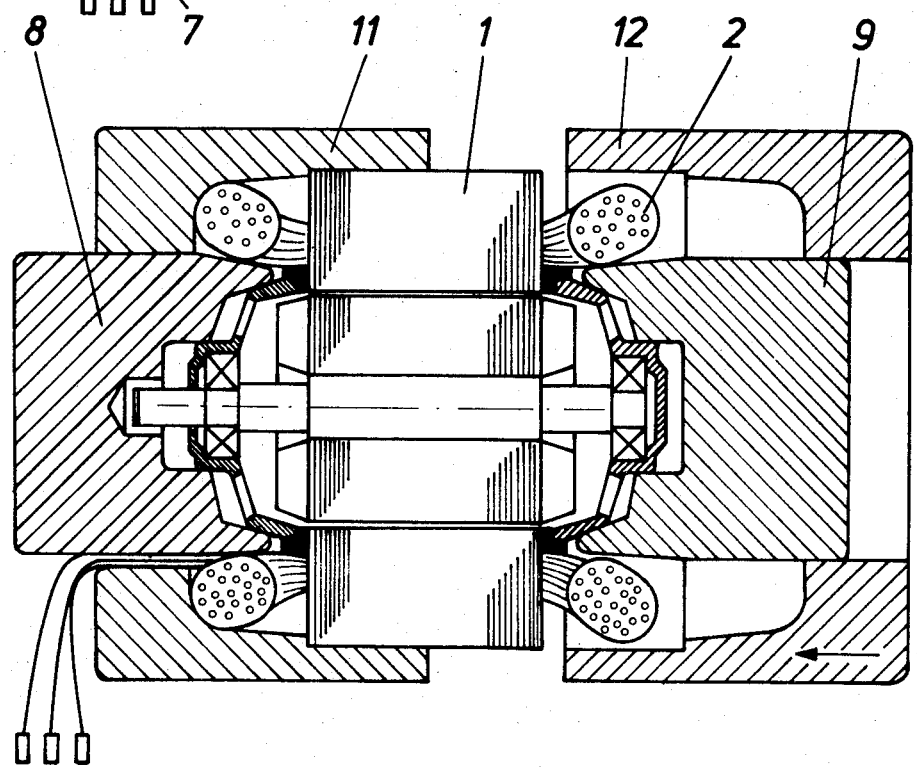

The invention will now be described with reference to the drawing. In the drawing FIG. 1 is a diagrammatic lengthwise section view of an electric motor mounted for a test run according to the invention and;

FIG. 2 is a similar section view of an electric motor with half-moulds added for impregnating the windings.

The electric motor shown in FIG. 1 is provided with a stator core 1 the stator windings of which have projecting winding heads denoted 2. A rotor 3 has a rotor shaft 4 journalled in bearings 5 accommodated in cup-shaped bearing supports 6 to be bonded to the stator core 1 inside the winding heads 2. The conductors for feeding current to the stator windings are denoted 7 whereas the rotor of the embodiments being described is assumed to be short-circuited, and thus is not provided with connection conduits. The illustrated motor is set up for a test run before its components have been permanently joined together. For this purpose two mandrels 8, 9 are applied coaxially against the ends of the cup-shaped bearing supports 6 after the rotor has been journalled in its bearings and the latter have been mounted in the bearing supports. When urged towards each other the mandrels compel the motor components to take up the position they will have in the finished motor. The mandrel members 8, 9 are shaped at their end portions engaging the bearing supports 6 with a profile corresponding to the outer shape of the cup-shaped support 6 and are sealing off any apertures in the bearing supports. The large end of each bearing support abuts rigid annular or stud means 10 provided at the ends of the stator core and is guided coaxially thereby. The mandrel members are preferably mounted so as to be axially displaceable in a non-illustrated test jig, and after clamping the motor between the mandrels and connecting the conductors 7 to an electric power source the motor can be submitted to a test run. After it has been established by means of instruments and, if needed, by perception, e.g., hearing and sensing, that the motor meets all demands in electric and mechanical respects, the bearing supports are bonded permanently to the stator core by cementing or moulding-in with a bonding substance, the mandrel members 8, 9 being held in the active illustrated position. Thereafter, the motor is removed from the testing and mounting jig and is ready for delivery or, in any case, will only require finishing operations unimportant from a functional point of view.

The mounting and testing device illustrated in FIG. 2 is identical with the one shown in FIG. 1 as far as the mandrel members 8,9 are concerned. These mandrel members are, however, supplemented by two outer half-moulds 11, 12, slidably guided by the corresponding mandrel member and, after having been moved together axially, will enclose within their cavity the stator core 1 and the winding heads 2. (The right-hand half-mould 12 is shown in a retracted position.) While the mandrel members 8,9 secure the bearing supports 6 and the rotor 3 during the test run and cementing or moulding-in of the bearing supports, the half-moulds 11,12 are used for embedding the stator windings in a synthetic resin or lacquer substance. After this substance has set the half-moulds and the mandrel members are retracted, and the motor is ready for mounting in an outer casing for delivery. Before that a final hardening of the bonding agent and insulating mass, for instance through heating of the windings with the rotor held stationary may have been carried out.

The bonding agent which secures the bearing supports in the finished motor may be applied to the surfaces before the test run and may be hardened by means of motor heat after the motor has passed the test. The substance for embedding the windings can be injected before the half-moulds have been brought together, or through non-illustrated conduits opening into the cavities of the mould.

Whereas the method according to the invention has been exemplified for an electric motor it is evident that it can be practised also in the manufacture of other rotary electric machines, and the protection thus extends to the manufacture of such machines as well as also to electric motors and other rotary electric machines manufactured according to the method as claimed in the appended claims.

What I claim is:

1. A method for manufacturing rotary electric machines, such as electric motors comprising a stator member having a rotor chamber, a rotor member in the rotor chamber and bearing support member permanently bonded to the stator at one end and supporting the rotor bearing means at its opposite end, consisting of the steps of assembling and supporting said rotor, stator, and bearing support members in an unsecured relationship under a compressive force between a pair of mandrels so that the rotor axis is coaxial with the rotor chamber in the stator and the bearing support member, subjecting the supported elements to a test to evaluate mechanical and electrical functioning and bonding the bearing support means to the stator core with a bonding agent prior to removal of the members from the support means if the unit passes predetermined mechanical and electrical test standards.

2. A method as claimed in claim 1 wherein the bearing support means is provided with an aperture and including the step of sealing off the aperture during the bonding operation to prevent bonding agent from penetrating into the rotor chamber.

3. A method as claimed in claim 1 including the step of insulating the stator after subjecting the machine to the mechanical and electrical functioning test.

4. A method as claimed in claim 1 including the step of feeding electric current to the machine after the mechanical and electrical functioning test and prior to removing it from the mounting means, the current being fed in a manner to cause the heat generated to act upon the bonding agent.

5. A method as claimed in claim 1 including the step of cementing the bearing means to the stator member.

6. A method as claimed in claim 1 including molding in the bearing support means to the stator member.

7. A method as claimed in claim 1 wherein the electric machine is an electric motor.

* * * * *